Jan. 19, 1965   G. KIPER   3,165,994
SHUTTER CONTROL STRUCTURE FOR CAMERAS
Filed March 9, 1960   3 Sheets-Sheet 2

INVENTOR.
GERD KIPER
BY

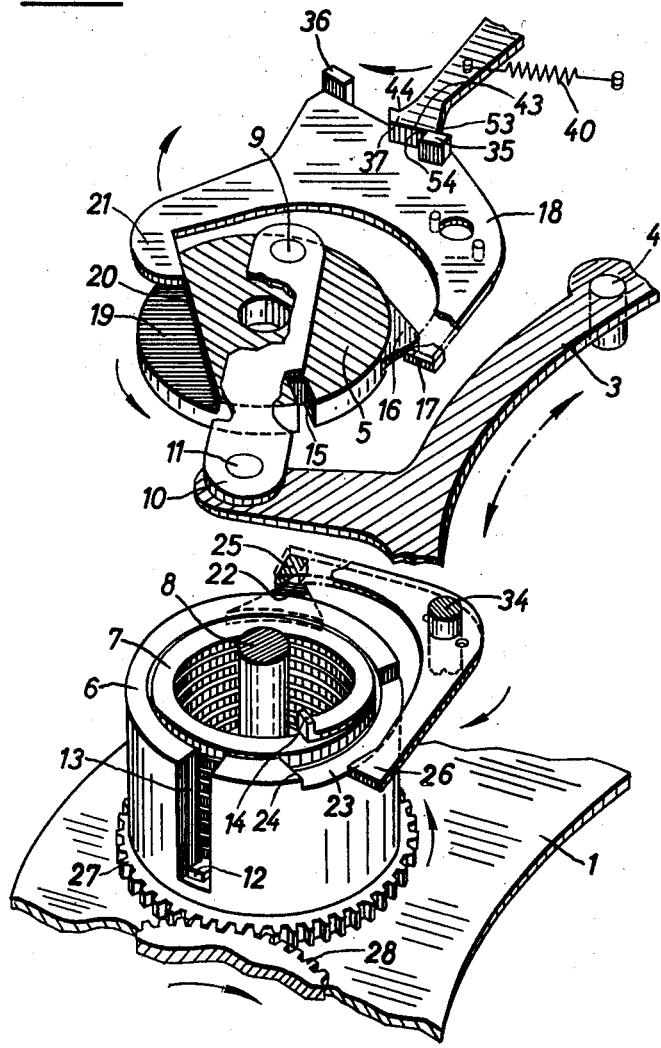

United States Patent Office 3,165,994
Patented Jan. 19, 1965

3,165,994
SHUTTER CONTROL STRUCTURE FOR CAMERAS
Gerd Kiper, Unterhaching, near Munich, Germany, assignor to Agfa Aktiengesellschaft, Leverkusen-Bayerwerk, Germany
Filed Mar. 9, 1960, Ser. No. 13,944
Claims priority, application Germany, Mar. 10, 1959, A 31,550
16 Claims. (Cl. 95—63)

The present invention relates to cameras.

More particularly, the present invention relates to still cameras. The present invention deals with that structure of a still camera which participates in the control of the shutter operation.

There are certain types of known still cameras which are capable of being operated in such a way that they will automatically make a series of exposures. Such cameras suffer from several defects, however. Thus, they are not adapted for use with modern cameras having exceedingly short exposure times, and also they are not capable of being used with cameras which have between the lens shutters.

One of the objects of the present invention is to provide a camera with a structure which will enable the camera to make automatically a series of exposures even where exposure time is exceedingly short and where the camera has a between the lens shutter.

Another object of the present invention is to provide a structure capable of controlling the shutter and at the same time characterized by extreme simplicity and full reliability in operation.

It is a further object of the present invention to provide a camera with a structure which enables the camera to be optionally set to take single exposures according to the will of the operator or to take in a fully automatic manner a series of exposures one after the other.

It is furthermore an object of the invention to provide a control structure which can be connected to the film-transporting structure so as to participate in the transportation of the film as well as in the actuation of the shutter, or which can be incorporated into a specialized camera which is adapted, for example, to make a series of exposures on the same film frame.

With the above objects in view the invention includes, in a camera, a support means and a rotary shutter drive means supported for rotation by this support means. A spring means cooperates with the rotary shutter drive means to drive the latter, and a tensioning means cooperates with the spring means to tension the latter. A control means cooperates with the shutter drive means and with the tensioning means to prevent operation of the tensioning means while the shutter drive means operates to actuate the shutter and to prevent operation of the shutter drive means while the tensioning means operates to tension the spring means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is an exploded perspective illustration of the shutter drive structure of FIG. 1.

Figure 1:
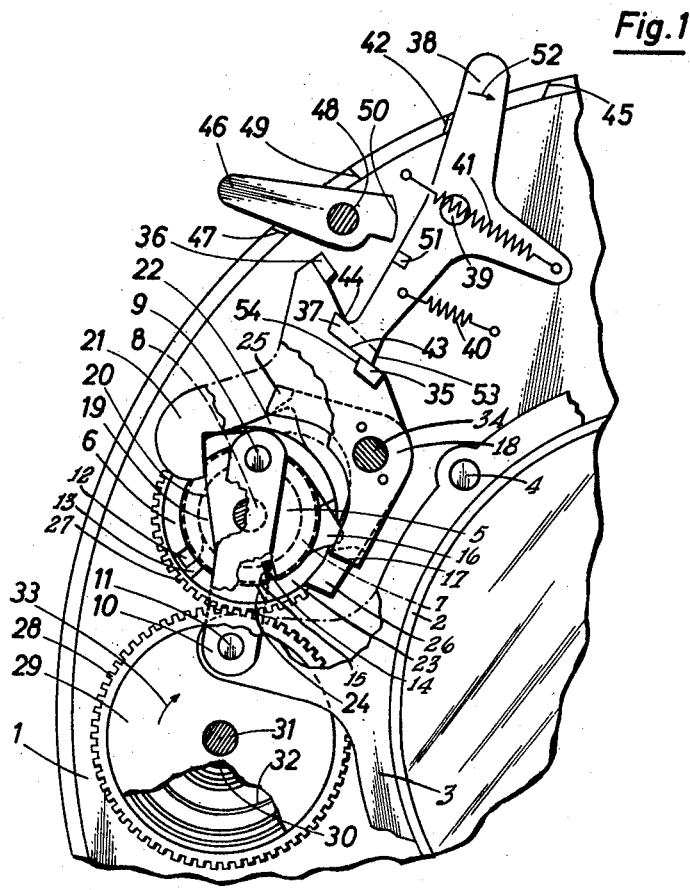
FIG. 1 is a fragmentary illustration of the shutter housing of a camera, FIG. 1 showing in the shutter housing the structure of the invention.

Referring now to FIG. 1, there is fragmentarily illustrated therein a shutter housing 1 which carries an inner tubular member 2 whose axis is coaxial with the optical axis, and this inner tubular member 2 supports for rotary movement a shutter ring 3 fragmentarily illustrated in FIG. 1. This shutter ring 3 carries a plurality of pins 4 distributed along the shutter ring, and these pins 4 form pin-and-slot connections in a conventional well-known manner with the several shutter blades which are also pivotally connected to stationary pins so that in this way the oscillatory rotary movement of the shutter ring 3 will result in a purely conventional manner in opening and closing of the shutter so as to make an exposure. The shutter blades are omitted for the sake of clarity.

The structure of the invention includes a rotary shutter drive means 5 (FIGS. 1 and 4) supported by the support means formed by the housing 1 and the stationary pin 8 carried thereby for rotary movement in one direction of turning, as will be apparent from the description below. Thus, the shutter drive means 5 is in the form of a member which is simply supported for rotation by the stationary pin 8. The drive member 5 is located next to a spring 7 which forms a spring means for driving the shutter drive means 5, and this spring 7 has an end 14 located in a notch 15 of the member 5 so that in this way the spring means 7 is operatively connected with the shutter drive means 5 to drive the latter. An annular member 6 forms a housing coaxial with the shutter drive means 5 and also supported for rotation by the pin 8, so that this annular member 6 is turnable with respect to the shutter drive means 5 about the axis of the latter. The other end 12 of the spring 7 is located in a cutout 13 of the housing 6, so that in this way the spring means 7 is operatively connected with the rotary housing member 6 to be tensioned upon turning of the latter in a counter clockwise direction, as viewed in FIG. 1, with respect to the shutter drive means 5. Thus, the annular housing member 6 forms part of a tensioning means for tensioning the spring means 7 which drives the rotary shutter drive means 5.

A coupling means is provided to couple the rotary shutter drive means 5 to the shutter ring 3, and this coupling means includes a crank pin 9 fixed to the shutter drive means 5 for rotary movement therewith and pivotally connected with one end of a connecting rod 10 whose opposite end is pivotally connected by a pin 11 to a radial projection of the shutter ring 3, so that with this coupling means 9–11 a single rotation of the shutter drive member 5 will result in an oscillatory cycle of operation of the shutter ring 3 turning the latter from rest position shown in FIG. 1 through a predetermined angle to a position where the shutter is fully open and then back to the rest position shown in FIG. 1 where the shutter is again closed, the shutter remaining closed when the ring 3 is in the region of the position thereof shown in FIG. 1.

A cam means in the form of a cam member 16 (FIGS. 1 and 4) is fixed to and carried by the rotary shutter drive means 5 for rotary movement therewith. The structure of the invention includes the control lever means 18 which is provided with a projection 17 which is acted upon by the cam 16. The rotary shutter drive means 5 is also formed with a cut-away portion 19 (FIG. 4) providing the rotary shutter drive means 5 with a stop surface 20 which in one position of the parts, shown in FIGS. 1 and 4, engages a tooth 21 of the control lever means 18, so that in this position of the parts the control lever means 18 engages the stop surface 20 of the rotary shutter drive means 5 to prevent actuation of the latter by the spring means 7. The cam 16 and the tooth 21 are displaced one with respect to the other along the axis of the pin 8 so that the cam 16 can turn past the tooth 21 without engaging the latter.

The rotary tensioning means or annular member 6 also fixedly carries a cam means formed by the cam 22 which is fixed to the rotary housing 6, and the tensioning means or housing 6 is formed with a cutout 23 which terminates in a stop surface 24 of the rotary housing or tensioning means 6. The control lever means 18 is actually a double-acting escapement member and is of substantially U-shaped configuration having the tooth 21 at one end. At its opposite end the control lever means 18 has a tooth 26 which is adapted to cooperate with the stop surface 24 when the escapement lever 18 is turned in a clockwise direction, as viewed in FIG. 1, about the stationary pin 34 to a release position where the tooth 21 is out of the range of movement of the stop surface 20 so as to release the shutter drive means 5 for rotary movement. In this release position of the escapement lever 18, the tooth 26 thereof is in the path of turning movement of the stop surface 24 to be engaged by the latter and prevent rotary movement of the tensioning means 6. The lever 18 is illustrated in FIGS. 1 and 4 in a tensioning position where it prevents turning movement of the shutter drive means 5 by the spring means 7 while allowing rotary movement of the housing 6 for the purpose of tensioning the spring means 7. Thus, the distance between the teeth 21 and 26 is great enough so that when the tooth 21 engages the stop surface 20 the tooth 26 is beyond the range of turning of the stop surface 24, while when the tooth 26 engages the stop surface 24 the tooth 21 is beyond the range of turning of the stop surface 20. The cam 22 which is fixed to the housing 6 for rotary movement therewith and the tooth 26 are displaced one with respect to the other along the axis of the pin 8 so that the cam 22 can turn past the tooth 26 without engaging the latter. The pin 34 which supports the control lever means 18 for oscillatory turning movement is fixedly carried by the housing 1 and forms with the latter part of the support means for the structure of the invention, and the pin 34 is parallel to the pin 8. The cam 22 cooperates with a tooth or projection 25 of lever means 18 for a purpose described below. As is evident from FIG. 4 the lever means 18 includes an upper lever portion terminating in the tooth 21 and projection 17 and a lower lever portion terminating in the tooth 26 and projection 25. These lever portions are respectively formed with aligned openings through which the pin 34 freely passes, and on opposite sides of these aligned openings the lever portions are each formed with a pair of smaller openings and these latter smaller openings receive a pair of pins which are fixed to the lever portions as by having a tight press fit in the opening which receive these pins, so that in this way the lever portions of the lever means 18 are permanently fixed to each other.

The tensioning means 6 is actuated to tension the spring means 7 by way of a moving means which includes a rotary spring barrel 29 supported for free rotary movement by a stationary pin 31 carried by the housing 1. A core 30 is supported also for free rotary movement by the pin 31 and is coaxially surrounded by the barrel 29 within which is located a spiral spring 32 fixed at its inner end to the rotary core 30 and at its outer end to the periphery of the barrel 29. For the sake of clarity the drawings do not show the purely conventional structure available to the operator for turning the core 30 in a clockwise direction, as viewed in FIG. 1, for the purpose of tensioning the spring 32, as well as for preventing rotary movement of the core 30 in the opposite direction once the spring 32 is manually tensioned. The spring 32 drives the barrel 29 in the direction of the arrow 33 of FIG. 1. A transmission means cooperates with the tensioning means 6 and the moving means 29–32 for transmitting movement of the latter to the tensioning means 6, and in the illustrated example this transmission means includes a gear 28 fixed coaxially to the periphery of the barrel 29 and meshing with a gear 27 fixed coaxially to the periphery of the housing 6. Of course, if desired, a different gear train including more gears than shown in FIG. 1 may be used. It will be noted that with this arrangement the spring 32 is tensioned by rotary movement of the core 30 with respect to the barrel 29 and the spring 32 expands during rotary movement of the barrel 29 with respect to the core 32, while the spring 7 is tensioned by rotary movement of the housing 6 with respect to the drive member 5 and expands during rotary movement of the drive member 5 with respect to the housing 6. Of course, the spring 32 is powerful enough to provide for several tensionings of the spring 7 before it is necessary for the operator to again manually tension the spring 32. The drawings do not illustrate, for the sake of clarity, the purely conventional structure for limiting the extent to which the spring 32 can expand as well as a conventional governor structure for controlling the speed with which the barrel 29 is turned by the spring 32.

The control lever means 18 (FIGS. 1 and 4) includes a pair of lugs 35 and 36 which are adapted to cooperate with a third lug 37 of a manually operable lever means 38 accessible to the operator for releasing the structure of the invention for operation. The manually operable lever means 38 has a free end portion extending to the exterior of the shutter housing through a slot formed in the exterior wall thereof, and this slot has one end 42 which defines the illustrated rest position of the lever means 38 and an opposite end 45 which limits the turning of the lever 38 by the operator and forms an operating position for the manually operable lever means 38. The lever 38 is turned by the operator in the direction of the arrow 52 from the rest position shown in FIG. 1 to its operating position. A stationary pin 39 is carried by the housing 1 and extends into an opening of the lever 38 to support the latter for turning movement between its rest and operating positions, and a spring 40 is fixed at one end to the lever 38 and at its opposite end to a stationary pin of the shutter housing 1 for yieldably urging the lever 38 to its rest position shown in FIG. 1 where it is adapted to engage the end 42 of the slot through which the lever 38 extends to the exterior of the shutter housing. It will be noted that in this rest position of the manually operable lever means 38, the lug 37 thereof engages the lug 35 of the control lever means 18. Thus, it will be seen that the front surface 43 of the lug 37 engages the lug 35 in the position of the parts shown in FIG. 1. When the operator turns the lever 38 to its operating position where it engages the stop 45, the rear surface 44 of the lug 37 will be engaged by the lug 36 for a purpose described below.

The structure of the invention also includes a manually operable setting lever 46 supported for turning movement by a stationary pin 48 in the housing 1 and extending through a slot of the housing 1 to the exterior of the latter, this slot providing a pair of stops 47 and 49 which cooperate with the setting lever 47 to limit the turning thereof. In the illustrated position where the setting lever 46 engages the stop 47, this lever 46 is in an inactive position where it does not in any way interfere with the movement of the lever 38 which at this time can be turned in a manner which is not at all influenced by the setting lever 46. However, the operator may turn the lever 46 in a clockwise direction, as viewed in FIG. 1, to an active position where it engages the stop 49 and where the end 50 of the setting lever 46 is located in the path of turning movement of the stop projection 51 of the lever 38, and the end 50 of the lever 46 in the active position of the latter engages the stop projection 51 to limit the turning of the lever 38 from its illustrated rest position toward its operating position to an intermediate position between the rest and operating positions of the lever 38 where the lug 37 will not be engaged by either of the lugs 35 and 36 and where the camera is thus set to automatically make a series of exposures.

Assuming that the setting lever 46 is in the inactive position thereof shown in FIG. 1, so that the successive exposures will be made according to the will of the operator then when it is desired to make an exposure the operator manually turns the manually operable lever means 38 from the rest position thereof shown in FIG. 1 to an operating position where it engages the stop 45. It will be noted that in addition to the return spring 40, a snap over center spring 41 is connected at one end to the lever 38 and at its opposite end to a stationary pin within the housing 1, and shortly after the lever 38 is turned from its rest position toward its operating position the spring 41 will move over the center so as to assist in the movement of the lever 38 towards its operating position, but the spring 40 is powerful enough to return the lever 38 to its rest position as soon as this lever is released by the operator. The spring 41 moves over its central position where it is tensioned to the greatest degree shortly before the lug 37 moves out of engagement with the lug 35 of the control lever means 18. As soon as the manually operable lever means 38 thus moves out of engagement with the lug 35, the cam 22 is free to act on the projection 25 of the lever 18 to turn the latter in response to the action of the spring 32 through the transmission 27, 28 on the housing 6. The tensioning means 6 at this time turns only through a relatively short angle since the result of engagement of the turning cam 22 of the tensioning means 6 with the projection 25 of the escapement lever 18 is to turn the latter in a clockwise direction, as viewed in FIG. 1, so that the tooth 26 thereof is located in the path of turning of the stop surface 24, and this stop surface will engage the tooth 26 so as to stop the turning of the tensioning means 6 by the spring 32, but of course this turning of the lever 18 has resulted in movement of the tooth 21 away from the stop surface 20, so that the shutter drive means 5 is now released and the spring 7 drives the shutter drive means 5 so as to act through the coupling means 9–11 on the shutter ring 3 to oscillate the same back and forth in order to make an exposure. The shutter will be closed somewhat before the shutter drive 5 completes a full revolution to return to the position thereof shown in FIG. 1. Before the shutter drive 5 can turn through a complete revolution the cam 16 fixed thereto will engage the projection 17 of the lever 18 and start to turn the latter in a counter clockwise direction, as viewed in FIG. 1 about the pivot pin 34 from its release position back toward its tensioning position, but the cam 16 is prevented from turning past the projection 17 by engagement of the lug 36 with the surface 44 of the lug 37 as long as the lever 38 is maintained in its operating position engaging the stop 45, and thus the parts cannot return to their starting positions shown in FIG. 1 until the operator releases the lever 38. However, the shutter has already closed when the lugs 36 and 37 are in engagement with each other. Also, at this time the stop surface 24 still engages the tooth 26 of the lever 18. It is only when the operator releases the lever 38 so that the spring 40 returns the latter to its rest position that the lug 37 moves away from the lug 36 to allow the cam 16 to continue to turn so as to turn the lever 18 back toward its tensioning position and allow the shutter drive 5 to return to its starting position. During the return of the lever 38 to its rest position the end 53 of the lug 37 engages and rides over the end 54 of the lug 35, and as soon as the end 53 moves beyond the end 54 the cam 16 can turn so as to move the parts to the position shown in FIG. 1 and the cam 16 will move beyond the projection 17 to the position shown in FIG. 1, the tooth 21 engaging the surface 20 so as to prevent further turning of the shutter drive means 5. However, at this time the tooth 26 is beyond the range of the surface 24 so that the tensioning means 6 can be turned by the moving means 29–32 and the transmission means 27, 28 for tensioning the spring 7, and this turning of the tensioning means 6 in a counter clockwise direction, as viewed in FIG. 1, continues until the cam 22, which has moved beyond the projection 25 when the surface 24 moved into engagement with the tooth 26, again reaches the projection 25 and starts to turn the lever 18 from its illustrated tensioning position toward its release position. However, such turning of the lever 18 in a clockwise direction is prevented by engagement of the lug 35 with the lug 37, so that the parts stop in a position shown in FIG. 1 and it will be noted that the spring 7 is thus automatically tensioned after the shutter drive means 5 has stopped operating. Thus, with the structure of the invention there will be alternate release of the shutter drive 5 and tensioning of the spring 7.

The operation alternately of the shutter drive means 5 and the tensioning means 6 is in no way influenced by the exposure time which is set into the camera by the operator or which is automatically set. The delay of the operation of the shutter structure so as to obtain the desired exposure time takes place only during the period when the shutter blades are in their open position. Even when the camera is set to make a time exposure (with the conventional lever for this purpose set in the B position) the structure of the invention will operate in the above-described manner until the B-lever acts in an unillustrated manner on the drive member 5 in order to hold the shutter blades in their open position for the predetermined number of seconds. Of course, at this time the annular housing 6 is still prevented from turning by engagement of the stop surface 24 with the tooth 26 of the escapement lever 18. If the lever 38 is released by the operator, then of course the B-lever is influenced in a known way so that it will only hold the drive lever 5 against turning when the shutter blades are in their open position for the predetermined period of time and will then release the drive member 5 so that the structure can then continue to operate in the manner described above with the drive member 5 turning so as to close the shutters and then place the cam 16 in engagement with the projection 17 so that the structure will then continue to operate as described above.

When the setting lever 46 is turned to its active position in engagement with the stop surface 49, the operator upon turning of the lever 38 in the direction of the arrow 52 will only be able to turn this lever 38 until the stop projection 51 thereof engages the end 50 of the lever 46, and the lever 38 will now be held by the operator in a position where the lug 37 is beyond the range of turning of the pair of lugs 35 and 36, so that at this time the cams can operate successively on the escapement control lever 18 to oscillate the latter back and forth between its tensioning and release positions and the above-described cycle of operations takes place continuously with repeated exposures being made as long as the operator holds the lever 38 in the intermediate position where its projection 51 engages the end 50 of the setting lever 46. When the operator releases the lever 38 the spring 40 will return it to its rest position and the automatic successive exposures will terminate.

Figure 2:
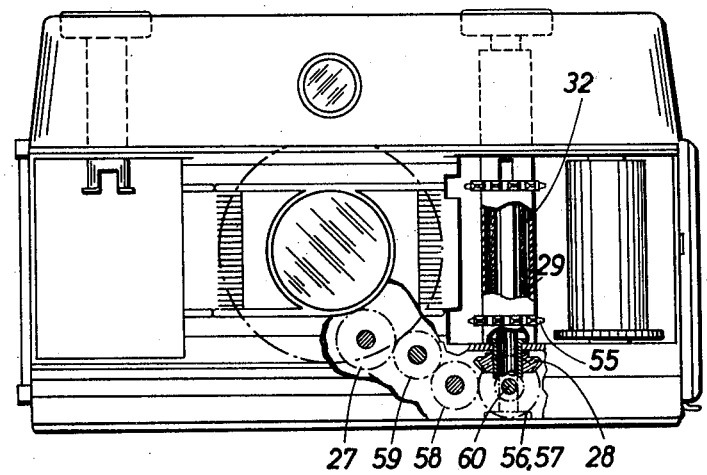
FIG. 2 is a diagrammatic, partly sectional elevation illustrating a different embodiment according to which the shutter control structure is also connected to the film-transporting structure of the camera.
Figure 3:
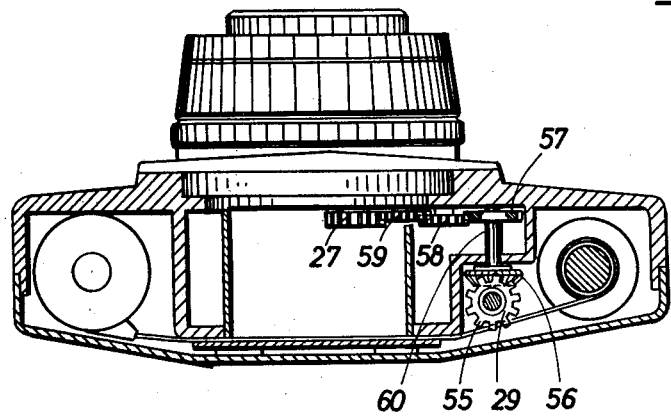
FIG. 3 is a diagrammatic sectional plan view of the structure of FIG. 2.

In the embodiment of the invention which is illustrated in FIGS. 2 and 3 the spring barrel 29 of FIG. 1 is replaced by a cylindrical spring housing 29' which surrounds the axis of the toothed film-transporting means 55, and the cylinder 20' can be turned by the spring 32' which is again manually tensioned in a known way by a structure which is not illustrated in FIGS. 2 and 3. The cylinder 29' is connected through the film-transporting means 55 with a bevel gear 28' which meshes with a second bevel gear 56 connected coaxially with a gear 57 which turns with the gear 56, and through the gear train 58, 59 the rotary movement of the gear 57 will be transmitted to the gear 27 which is identical with the gear 27 described above and shown in FIG. 1 and which cooperates in the same way with the tensioning means 6 for operating the above-described structure of FIG. 1. A shaft 60 extends between and is connected to the bevel gear 56 and the gear 57 for transmitting the rotary movement of the gear 56 to the gear 57. Thus, with this embodiment, during each tensioning of the spring means 7 which drives the shutter drive means 5 the housing 29' will turn not only to effect this tensioning of the spring 7 in the manner described above but also to turn the film-transporting means 55, and thus the film is transported simultaneously with the tensioning of the spring 7, so that with this arrangement the transportation of the film frame by frame takes place simultaneously with the successive tensionings of the spring 7. Thus, it will be seen that with the embodiment of FIGS. 2 and 3, when the setting lever 46 is set in its active position so as to enable successive exposures to be made automatically, these exposures will be made on successive film frames, in a fully automatic manner, and there will be no double exposure. On the other hand, an arrangement such as is shown in FIG. 1 where the moving means 29–32 is not connected with the film-transporting structure can be used for special purposes where a series of exposures are to be made on a single film frame. For example, it is sometimes desired to photograph several different stages of certain operations on the same film frame, and this can be done with the structure of FIG. 1 in an automatic manner where the same film frame is exposed several times when the lever 46 is placed in its active position as described above.

It will be seen, therefore, that with the structure of the invention it is possible to have a between the lens shutter operated so that it can, at the option of the operator, make several exposures automatically, and furthermore, because the structure of the invention includes a rotary shutter drive means 5 which always turns in the same direction through a single revolution in order to carry out a full cycle of operations, it is possible to provide extremely short exposure times without any difficulty.

Although, as has been pointed out above in connection with FIG. 1, the structure can be used for a special purpose camera where several exposures are to be made on a single film frame, the structure shown in FIG. 1 will most often be used with that type of still camera where the transportation of the film and the cocking of the shutter are mechanically coupled in a known manner so that the film will be transported after each exposure.

It will be understood that each of the elements described above, or two or more together, may also find a useful application in other types of cameras differing from the types described above.

While the invention has been illustrated and described as embodied in shutter control structure for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera having a between-the-lens shutter, in combination, support means; a shutter ring supported by said support means for oscillatory movement about the optical axis to open and close the shutter; rotary shutter drive means supported for rotation by said support means, said drive means being located adjacent and operatively connected to said shutter ring to oscillate the latter during rotary movement of said drive means; spring means cooperating with said rotary shutter drive means for driving the latter in only one direction; rotary tensioning means coaxial with said drive means and cooperating with said spring means for tensioning the latter; and a combined blocking and release arrangement including blocking and release means cooperating with said rotary shutter drive means on the one hand and said rotary tensioning means on the other hand in such a manner that a release means releases operation of said rotary shutter drive means when a blocking means blocks operation of said rotary tensioning means, and vice-versa, that a release means releases operation of said rotary tensioning means when a blocking means blocks operation of said rotary shutter drive means.

2. In a camera having a between-the-lens shutter, in combination, support means; a shutter ring supported by said support means for oscillatory movement about the optical axis to open and close the shutter; rotary shutter drive means supported for rotation by said support means, said drive means being directly linked to said shutter ring for oscillating the latter during rotary movement of said shutter drive means; spring means coaxial with and cooperating with said rotary shutter drive means for driving the latter in only one direction; rotary tensioning means carried by said support means coaxially with said shutter drive means and spring means and cooperating with said spring means for tensioning the latter; and a combined blocking and release arrangement including blocking and release means cooperating with said rotary shutter drive means on the one hand and said rotary tensioning means on the other hand in such a manner that a release means releases operation of said rotary shutter drive means when a blocking means blocks operation of said rotary tensioning means, and vice-versa, that a release means releases operation of said rotary tensioning means when a blocking means blocks operation of said rotary shutter drive means.

3. In a camera having a between-the-lens shutter, in combination, support means; a shutter ring supported by said support means for oscillatory movement about the optical axis to open and close the shutter; rotary shutter drive means supported for rotary movement by said support means and turnable through a predetermined angle while performing a given cycle of operations, said drive means being operatively connected to said ring for oscillating the latter; spring means cooperating with said shutter drive means for driving the latter in only one direction; a rotary tensioning housing enclosing said spring means and cooperating with said spring means for automatically tensioning the latter during rotation of said housing, said support means supporting said housing coaxially with said shutter drive means; and a combined blocking and release arrangement including blocking and release means cooperating with said rotary shutter drive means on the one hand and said rotary tensioning housing on the other hand in such a manner that a release means releases operation of said rotary shutter drive means when a blocking means blocks operation of said rotary tensioning housing, and vice-versa, that a release means releases operation of said rotary tensioning housing when a blocking means blocks operation of said rotary shutter drive means.

4. In a camera having a between-the-lens shutter, in combination, support means; a shutter ring supported by said support means for oscillatory movement about the optical axis to open and close the shutter; rotary shutter drive means turnably carried by said support means, said drive means being operatively connected to said ring for oscillating the latter during rotation of said drive means; a first housing coaxial with said shutter drive means and carried by said support means for turning movement with respect to said shutter drive means around the turning axis thereof; first spring means in said first housing connected at one end to said shutter drive means and at an opposite end to said first housing for driving said shutter drive means; a second housing supported for rotation by said support means; a core coaxial with said second housing and carried by said support means for turning movement with respect to said second housing, said second housing surrounding said core; second spring means located between said core and the outer periphery of the rotary second housing and respectively having opposite ends connected to said core and said periphery; and transmission means between said housings for transmitting movement of said second housing to said first housing, said second spring means being tensioned by rotation of said core with respect to said second housing and expanding during turning said second housing with respect to said core, while said first spring means is tensioned by turning of said first housing with respect to said shutter drive means and expands during driving of said shutter drive means with respect to said first housing.

5. In a camera having a between-the-lens shutter, in combination, support means; a shutter ring supported by said support means for oscillatory movement about the optical axis to open and close the shutter; rotary shutter drive means turnably carried by said support means, said drive means being operatively connected to said ring for oscillating the latter during rotation of said drive means; a first housing coaxial with said shutter drive means and carried by said support means for turning movement with respect to said shutter drive means around the turning axis thereof; first spring means in said first housing connected at one end to said shutter drive means and at an opposite end to said first housing for driving said shutter drive means; a second housing supported for rotation by said support means; a core coaxial with said second housing and carried by said support means for turning movement with respect to said second housing, said second housing surrounding said core; second spring means located between said core and the outer periphery of the rotary second housing and respectively having opposite ends connected to said core and said periphery; and transmission means between said housings for transmitting movement of said second housing to said first housing, said second spring means being tensioned by rotation of said core with respect to said second housing and expanding during turning said second housing with respect to said core, while said first spring means is tensioned by turning of said first housing with respect to said shutter drive means and expands during driving of said shutter drive means with respect to said first housing, said transmission means being in the form of gearing connected with said housings.

6. In a camera, in combination, support means; rotary shutter drive means supported for rotation by said support means; spring means cooperating with said shutter drive means for driving the latter; tensioning means cooperating with said spring means for tensioning the same; and double-acting escapement means forming a combined blocking and release arrangement including blocking and release means cooperating with said rotary shutter drive means on the one hand and said tensioning means on the other hand in such a manner that a release means releases operation of said rotary shutter drive means when a blocking means blocks operation of said tensioning means, and vice-versa, that a release means releases operation of said tensioning means when a blocking means blocks operation of said rotary shutter drive means.

7. In a camera, in combination, support means; rotary shutter drive means supported for rotation by said support means, said rotary shutter drive means having a stop surface and carrying a cam which turns with said rotary shutter drive means; spring means cooperating with said rotary shutter drive means for driving the latter; rotary tensioning means cooperating with said spring means for tensioning the same, said rotary tensioning means having also a stop surface and fixedly carrying a cam which turns with said rotary tensioning means; and control lever means turnably carried by said support means for oscillatory movement between a tensioning position where said lever means engages said stop surface of said shutter drive means to prevent driving of the latter by said spring means while said lever means is out of the path of movement of said stop surface of said rotary tensioning means so that the latter is free to turn in order to tension said spring means while said control lever means is in said tensioning position thereof, and a release position where said lever means engages said stop surface of said rotary tensioning means to prevent turning of the latter to tension said spring means while said lever means is out of the path of movement of said stop surface of said shutter drive means so that the latter is released to drive the shutter of the camera while said lever means is in said release position thereof, said control lever means cooperating with said cam of said rotary shutter drive means to be turned by the latter cam from said release position to said tensioning position and said lever means cooperating with said cam carried by said rotary tensioning means to be turned by the latter cam from said tensioning position to said release position.

8. In a camera, in combination, support means; rotary shutter drive means supported for rotation by said support means; said rotary shutter drive means having a stop surface and carrying a cam which turns with said rotary shutter drive means; spring means cooperating with said rotary shutter drive means for driving the latter; rotary tensioning means cooperating with said spring means for tensioning the same, said rotary tensioning means having also a stop surface and fixedly carrying a cam which turns with said rotary tensioning means; and control lever means turnably carried by said support means for oscillatory movement between a tensioning position where said lever means engages said stop surface of said shutter drive means to prevent driving of the latter by said spring means while said lever means is out of the path of movement of said stop surface of said rotary tensioning means so that the latter is free to turn in order to tension said spring means while said control lever means is in said tensioning position thereof, and a release position where said lever means engages said stop surface of said rotary tensioning means to prevent turning of the latter to tension said spring means while said lever means is out of the path of movement of said stop surface of said shutter drive means so that the latter is released to drive the shutter of the camera while said lever means is in said release position thereof, said control lever means cooperating with said cam of said rotary shutter drive means to be turned by the latter cam from said release position to said tensioning position and said lever means cooperating with said cam carried by said rotary tensioning means to be turned by the latter cam from said tensioning position to said release position, said shutter drive means and said tensioning means being coaxial.

9. In a camera, in combination, support means; rotary shutter drive means supported for rotation by said support means, said rotary shutter drive means having a stop surface and carrying a cam which turns with said rotary shutter drive means; spring means cooperating with said rotary shutter drive means for driving the latter; rotary tensioning means cooperating with said spring means for tensioning the same, said rotary tensioning means having also a stop surface and fixedly carrying a cam which turns with said rotary tensioning means; control lever means turnably carried by said support means for oscillatory movement between a tensioning position where said lever means engages said stop surface of said shutter drive means to prevent driving of the latter by said spring means while said lever means is out of the path of movement of said stop surface of said rotary tensioning means so that the latter is free to turn in order to tension said spring means while said control lever means is in said tensioning position thereof, and a release position where said lever means engages said stop surface of said rotary tensioning means to prevent turning of the latter to tension said spring means while said lever means is out of the path of movement of said stop surface of said shutter drive means so that the latter is released to drive the shutter of the camera while said lever means is in said release position thereof, said control lever means cooperating with said cam of said rotary shutter drive means to be turned by the latter cam from said release position to said tensioning position and said lever means cooperating with said cam carried by said rotary tensioning means to be turned by the latter cam from said tensioning position to said release position; and manually operable lever means having a rest position cooperating with said control lever means for preventing the latter from being turned by said cam carried by said tensioning means from said tensioning position to said release position, said manually operable lever means being manually turnable from said rest position thereof to an operating position where said manually operable lever means frees said control lever means to be turned by said cam carried by said tensioning means from said tensioning to said release position so that upon turning of said manually operable lever means from said rest to said operating position thereof the shutter drive means is released to drive the shutter and make an exposure.

10. In a camera, in combination, support means; rotary shutter drive means supported for rotation by said support means, said rotary shutter drive means having a stop surface and carrying a cam which turns with said rotary shutter drive means; spring means cooperating with said rotary shutter drive means for driving the latter; rotary tensioning means cooperating with said spring means for tensioning the same, said rotary tensioning means having also a stop surface and fixedly carrying a cam which turns with said rotary tensioning means; control lever means turnably carried by said support means for oscillatory movement between a tensioning position where said lever means engages said stop surface of said shutter drive means to prevent driving of the latter by said spring means while said lever means is out of the path of movement of said stop surface of said rotary tensioning means so that the latter is free to turn in order to tension said spring means while said control lever means is in said tensioning position thereof, and a release position where said lever means engages said stop surface of said rotary tensioning means to prevent turning of the latter to tension said spring means while said lever means is out of the path of movement of said stop surface of said shutter drive means so that the latter is released to drive the shutter of the camera while said lever means is in said release position thereof, said control lever means cooperating with said cam of said rotary shutter drive means to be turned by the latter cam from said release position to said tensioning position and said lever means cooperating with said cam carried by said rotary tensioning means to be turned by the latter cam from said tensioning position to said release position; and manually operable lever means having a rest position cooperating with said control lever means for preventing the latter from being turned by said cam carried by said tensioning means from said tensioning position to said release position, said manually operable lever means being manually turnable from said rest position thereof to an operating position where said manually operable lever means frees said control lever means to be turned by said cam carried by said tensioning means from said tensioning to said release position so that upon turning of said manually operable lever means from said rest to said operating position thereof the shutter drive means is released to drive the shutter and make an exposure, said manually operable lever means when it is in said operating position thereof cooperating with said control lever means to prevent turning of the latter by said cam carried by said shutter drive means from said release position to said tensioning position, whereby said cam carried by said shutter drive means cannot return said control lever means from said release to said tensioning position thereof until said manually operable lever means has returned to said rest position thereof.

11. In a camera, in combination, support means; rotary shutter drive means supported for rotation by said support means, said rotary shutter drive means having a stop surface and carrying a cam which turns with said rotary shutter drive means; spring means cooperating with said rotary shutter drive means for driving the latter; rotary tensioning means cooperating with said spring means for tensioning the same, said rotary tensioning means having also a stop surface and fixedly carrying a cam which turns with said rotary tensioning means; control lever means turnably carried by said support means for oscillatory movement between a tensioning position where said lever means engages said stop surface of said shutter drive means to prevent driving of the latter by said spring means while said lever means is out of the path of movement of said stop surface of said rotary tensioning means so that the latter is free to turn in order to tension said spring means while said control lever means is in said tensioning position thereof, and a release position where said lever means engages said stop surface of said rotary tensioning means to prevent turning of the latter to tension said spring means while said lever means is out of the path of movement of said stop surface of said shutter drive means so that the latter is released to drive the shutter of the camera while said lever means is in said release position thereof, said control lever means cooperating with said cam of said rotary shutter drive means to be turned by the latter cam from said release position to said tensioning position and said lever means cooperating with said cam carried by said rotary tensioning means to be turned by the latter cam from said tensioning position to said release position; manually operable lever means having a rest position cooperating with said control lever means for preventing the latter from being turned by said cam carried by said tensioning means from said tensioning position to said release position, said manually operable lever means being manually turnable from said rest position thereof to an operating position where said manually operable lever means frees said control lever means to be turned by said cam carried by said tensioning means from said tensioning to said release position so that upon turning of said manually operable lever means from said rest to said operating position thereof the shutter drive means is released to drive the shutter and make an exposure, said manually operable lever means when it is in said operating position thereof cooperating with said control lever means to prevent turning of the latter by said cam carried by said shutter drive means from said release position to said tensioning position, whereby said cam carried by said shutter drive means cannot return said control lever means from said release to said tensioning position thereof until said manually operable lever means has returned to said rest position thereof; and a manually operable setting lever turnably carried by said support means for movement between an inactive position where said setting lever does not influence the operation of said manually operable lever means and an active position where said setting lever is located in the path of movement of said manually operable lever means to limit the latter to movement from said rest position thereof to an intermediate position between said rest and said operating positions thereof, said manually operable lever means in said intermediate position thereof being out of cooperative relation with said control lever means so that said cams will operate one after the other to oscillate said control lever means between said release and tensioning positions thereof, whereby when said setting lever is placed by the operator in said active position thereof the camera is set to automatically make a series of exposures in succession.

12. In a camera, in combination, support means; a shutter ring supported for oscillatory arcuate movement by said support means; a rotary shutter drive member supported for rotation by said support means and having a stop surface; coupling means connecting said drive member to said shutter rings for oscillating the latter back and forth through a single cycle of operations during a single revolution of said shutter drive member; a spring connected at one end to said shutter drive member; a rotary annular member coaxially surrounding said shutter drive member and supported by said support means for turning movement with respect thereto, the other end of the spring being connected to said annular member, so that the latter may be turned with respect to said drive member for tensioning the spring so that the latter will actuate said drive member, said annular member also having a stop surface; moving means cooperating with said annular member for turning the latter to tension said spring; a substantially U-shaped control lever supported for oscillatory turning movement by said support means about an axis parallel to the common axis of turning of said drive member and annular member, said substantially U-shaped control lever having at one end a tooth which engages said stop surface of said drive member to prevent turning of the latter by said spring and having at its opposite end a tooth engaging said stop surface of said annular member to prevent turning of the latter by said moving means, and the distance between said teeth being large enough to locate the tooth which cooperates with said stop surface of said annular member out of the range of turning of said latter stop surface when the tooth which cooperates with said stop surface of said drive member engages the latter stop surface, so that when the tooth which cooperates with said stop surface of said annular member engages the latter stop surface the tooth which cooperates with said stop surface of said drive member is out of the range of turning of the latter stop surface; first cam means carried by said drive member for rotary movement therewith and cooperating with said lever for turning the latter to a position where the first-mentioned tooth thereof cooperates with said stop surface of said drive member to prevent turning of the latter by said spring; and second cam means cooperating with said lever for turning the latter to a position where the second-mentioned tooth thereof cooperates with said stop surface of said annular member to prevent turning of the latter by said moving means, whereby said lever acts as a double-acting escapement and is actuated by said first and second cam means for alternately interrupting the operation of said shutter drive member and said annular member so as to alternately tension said spring and release the shutter drive member for turning movement.

13. In a camera, in combination, support means; a shutter ring supported for oscillatory arcuate movement by said support means; a rotary shutter drive member supported for rotation by said support means and having a stop surface; coupling means connecting said drive member to said shutter ring for oscillating the latter back and forth through a single cycle of operations during a single revolution of said shutter drive member; a spring connected at one end of said shutter drive member; a rotary annular member coaxially surrounding said shutter drive member and supported by said support means for turning movement with respect thereto, the other end of the spring being connected to said annular member, so that the latter may be turned with respect to said drive member for tensioning the spring so that the latter will actuate said drive member, said annular member also having a stop surface; moving means cooperating with said annular member for turning the latter to tension said spring; a substantially U-shaped control lever supported for oscillatory turning movement by said support means about an axis parallel to the common axis of turning of said drive member and annular member, said substantially U-shaped control lever having at one end a tooth which engages said stop surface of said drive member to prevent turning of the latter by said spring and having at its opposite end a tooth engaging said stop surface of said annular member to prevent turning of the latter by said moving means, and a distance between said teeth being large enough to locate the tooth which cooperates with said stop surface of said annular member out of the range of turning of said latter stop surface when the tooth which cooperates with said stop surface of said drive member engages the latter stop surface, so that when the tooth which cooperates with said stop surface of said annular member engages the latter stop surface the tooth which cooperates with said stop surface of said drive member is out of the range of turning of the latter stop surface; first cam means carried by said drive member for rotary movement therewith and cooperating with said lever for turning the latter to a position where the first-mentioned tooth thereof cooperates with said stop surface of said drive member to prevent turning of the latter by said spring; second cam means cooperating with said lever for turning the latter to a position where the second-mentioned tooth thereof cooperates with said stop surface of said annular member to prevent turning of the latter by said moving means, whereby said lever acts as a double-acting escapement and is actuated by said first and second cam means for alternately interrupting the operation of said shutter drive member and said annular member so as to alternately tension said spring and release the shutter drive member for turning movement; a pair of lugs respectively fixed to and extending from said control lever; and a manually operable lever turnably carried by said support means and having a third lug cooperating with one of said pair of lugs to prevent turning of said control lever by said second cam means until said manually operable lever is turned from a rest position to an operating position thereof, and said third lug cooperating with the other of said pair of lugs when said manually operable lever is in said operating position thereof to prevent turning of said control lever by said first cam means.

14. In a camera, in combination, support means; a shutter ring supported for oscillatory arcuate movement by said support means; a rotary shutter drive member supported for rotation by said support means and having a stop surface; coupling means connecting said drive member to said shutter ring for oscillating the latter back and forth through a single cycle of operations during a single revolution of said shutter drive member; a spring connected at one end of said shutter drive member; a rotary annular member coaxially surrounding said shutter drive member and supported by said support means for turning movement with respect thereto, the other end of the spring being connected to said annular member, so that the latter may be turned with respect to said drive member for tensioning the spring so that the latter will actuate said drive member, said annular member also having a stop surface; moving means cooperating with said annular member for turning the latter to tension said spring; a substantially U-shaped control lever supported for oscillatory turning movement by said support means about an axis parallel to the common axis of turning of said drive member and annular member, said substantially U-shaped control lever having at one end a tooth which engages said stop surface of said drive member to prevent turning of the latter by said spring and having at its opposite end a tooth engaging said stop surface of said annular member to prevent turning of the latter by said moving means, and a distance between said teeth being large enough to locate the tooth which cooperates with said stop surface of said annular member out of the range of turning of said latter stop surface when the tooth which cooperates with said stop surface of said drive member engages the latter stop surface, so that when the tooth which cooperates with said stop surface of said annular member engages the latter stop surface the tooth which cooperates with said stop surface of said drive member is out of the range of turning of the latter stop surface; first cam means carried by said drive member for rotary movement therewith and cooperating with said lever for turning the latter to a position where the first-mentioned tooth thereof cooperates with said stop surface of said drive member to prevent turning of the latter by said spring; second cam means cooperating with said lever for turning the latter to a position where the second-mentioned tooth thereof cooperates with said stop surface of said annular member to prevent turning of the latter by said moving means, whereby said lever acts as a double-acting escapement and is actuated by said first and second cam means for alternately interrupting the operating of said shutter drive member and said annular member so as to alternately tension said spring and release the shutter drive member for turning movement; a pair of lugs respectively fixed to extending from said control lever; a manually operable lever turnably carried by said support means and having a third lug cooperating with one of said pair of lugs to prevent turning of said control lever by said second cam means until said manually operable lever is turned from a rest position to an operating position thereof, and said third lug cooperating with the other of said pair of lugs when said manually operable lever is in said operating position thereof to prevent turning of said control lever by said first cam means; and a manually operable setting lever having an inactive position where it does not influence the operation of said manually operable lever and having an active position where said setting lever is located in the path of turning of said manually operable lever to limit the latter to turning movement from said rest position toward said operating position to an intermediate position between said rest and operating positions where said third lug is beyond the range of movement of said pair of lugs, so that when the operator moves said setting lever to said active position thereof the camera is set for automatically making successive exposures.

15. In a camera, in combination, support means; rotary shutter drive means supported for rotation by said support means; spring means cooperating with said shutter drive means for driving the latter; tensioning means cooperating with said spring means for tensioning the same; control lever means forming a combined blocking and release arrangement including blocking and release means cooperating with said rotary shutter drive means on the one hand and said tensioning means on the other hand in such a manner that a release means releases operation of said rotary shutter drive means when a blocking means blocks operation of said tensioning means, and vice-versa, that a release means releases operation of said tensioning means when a blocking means blocks operation of said rotary shutter drive means, said control lever means having a rest position preventing operation of both said shutter drive means and said tensioning means and said control lever means being urged by said spring means from said rest position and when displaced from said rest position providing a cyclical operation of said drive means and tensioning means in a given sequence in each cycle; and manually operable lever means having an inactive position where said manually operable lever means maintains said control lever means in said rest position, said manually operable lever means being displaceable by the operator from said inactive position toward an active position releasing said control lever means for movement from said rest position thereof, said manually operable lever means when displaced all the way to said active position thereof cooperating with said control lever means to provide one cycle of operation and said manually operable lever means having between said active and inactive positions thereof an intermediate position where said manually operable lever means is out of cooperative relation with said control lever means so that a plurality of cycles of operation will take place automatically when said manually operable lever means is in said intermediate position thereof.

16. In a camera as recited in claim 15, and wherein a manually operable setting means cooperates with said manually operable lever means for retaining the latter in said intermediate position thereof when said setting means is in one position and for freeing said manually operable lever means for movement between said active and inactive positions thereof when said setting means is in another position.

References Cited by the Examiner
UNITED STATES PATENTS

| | | | |
|---|---|---|---|
| 1,243,086 | 10/17 | Marks | 95—63 |
| 2,160,818 | 6/39 | Becker | 95—31 |
| 2,227,240 | 12/40 | Becker et al. | 95—31 |
| 2,256,207 | 9/41 | Leitz | 95—31 |
| 2,393,534 | 1/46 | Hineline | 95—31 |
| 2,482,596 | 9/49 | Rattray | 95—31 |
| 2,514,991 | 7/50 | Doyle | 95—31 |
| 2,849,938 | 9/58 | Gebele et al. | 95—63 |
| 2,969,722 | 1/61 | Schwartz | 95—31 |
| 2,980,003 | 4/61 | Draghi | 95—63 |
| 3,044,381 | 7/62 | Elliott | 95—63 |

NORTON ANSHER, *Primary Examiner.*

D. B. LOWE, JOHN M. HORAN, EMIL G. ANDERSON, *Examiners.*